US009913191B2

(12) United States Patent
Schmidt et al.

(10) Patent No.: US 9,913,191 B2
(45) Date of Patent: Mar. 6, 2018

(54) BASE STATION AND METHOD FOR EARLY HANDOVER USING UPLINK CHANNEL CHARACTERISTICS

(71) Applicant: Intel IP Corporation, Santa Clara, CA (US)

(72) Inventors: Andreas Schmidt, Braunschweig (DE); Yujian Zhang, Beijing (CN); Hong He, Beijing (CN); Ana Lucia Pinheiro, Breinigsville, PA (US); Candy Yiu, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 476 days.

(21) Appl. No.: 14/137,176

(22) Filed: Dec. 20, 2013

(65) Prior Publication Data

US 2015/0181492 A1 Jun. 25, 2015

(51) Int. Cl.
*H04W 36/30* (2009.01)
*H04W 36/04* (2009.01)

(52) U.S. Cl.
CPC ............ *H04W 36/30* (2013.01); *H04W 36/04* (2013.01)

(58) Field of Classification Search
CPC ... H04W 84/045; H04W 24/02; H04W 36/04; H04W 36/22; H04W 36/0055; H04W 36/32; H04W 16/10; H04W 16/32; H04W 28/08; H04W 36/18; H04W 72/0486; H04W 16/14; H04W 24/10; H04W 36/00;
(Continued)

(56) References Cited

U.S. PATENT DOCUMENTS 6,438,377 B1* 8/2002 Savolainen ........... H04W 36/30
370/332
2005/0272426 A1* 12/2005 Yang ..................... H04W 36/30
455/436
(Continued)

FOREIGN PATENT DOCUMENTS

CN 105745966 A 7/2016
JP 2010522506 A 7/2010
(Continued)

OTHER PUBLICATIONS

"Evolved Universal Terrestrial Radio Access (E-UTRA) and Evolved Universal Terrestrial Radio Access Network (E-UTRAN); Overall description; Stage 2", 3GPP TS 36.300 version 11.5.0 Release 11), (Apr. 2013), 223 pgs submitted in 5 parts due to file size.

(Continued)

*Primary Examiner* — Marsha D. Banks Harold
*Assistant Examiner* — Natasha W Cosme
(74) *Attorney, Agent, or Firm* — Schwegman Lundberg & Woessner, P.A.

(57) ABSTRACT

Embodiments of a base station and method for early handover using uplink channel characteristics in a wireless network are generally described herein. In some embodiments, a method for handover determination is performed by an enhanced node B (eNB) operating as a serving cell base station. In these embodiments, a handover decision is based on a signal level of uplink transmissions of user equipment (UE) measured at a target cell base station in addition to signal levels of downlink signals of the target cell base station and downlink signals of a serving cell base station measured at the UE.

20 Claims, 5 Drawing Sheets

(58) Field of Classification Search
CPC ......... H04W 36/0061; H04W 36/0083; H04W 36/245
USPC ...... 370/332, 241.1, 329, 252; 455/436, 443
See application file for complete search history.

(56) References Cited

U.S. PATENT DOCUMENTS

| | | | |
|---|---|---|---|
| 2006/0079235 | A1 | 4/2006 | Kim |
| 2007/0015511 | A1* | 1/2007 | Kwun .................. H04W 36/30 455/436 |
| 2012/0021788 | A1 | 1/2012 | Yavuz et al. |
| 2012/0163305 | A1* | 6/2012 | Nimbalker ........ H04W 52/0206 370/329 |
| 2013/0170362 | A1* | 7/2013 | Futaki .................. H04W 24/02 370/241.1 |
| 2014/0080484 | A1* | 3/2014 | Centonza ............ H04W 76/045 455/436 |
| 2014/0112180 | A1* | 4/2014 | Axmon ................ H04W 24/10 370/252 |

FOREIGN PATENT DOCUMENTS

| | | | |
|---|---|---|---|
| JP | 2013541903 | A | 11/2013 |
| KR | 1020100114345 | A | 10/2010 |
| KR | 1020120111581 | A | 10/2012 |
| KR | 1020130029275 | A | 3/2013 |
| KR | 1020130068252 | A | 6/2013 |
| KR | 101783665 | B1 | 9/2017 |
| WO | WO-2007129300 | A1 | 11/2007 |
| WO | WO-2008116027 | A2 | 9/2008 |
| WO | WO-2012043307 | A1 | 4/2012 |
| WO | WO-2012100746 | A1 | 8/2012 |
| WO | WO-2015094701 | A1 | 6/2015 |

OTHER PUBLICATIONS

"Impact of small cell enhancements to RRC functions", 3GPP TSG-RAN WG2 Meeting #82, R2-131672, (May 24, 2013), 6 pgs.
"International Application Serial No. PCT/US2014/068639, International Preliminary Report on Patentability dated Jun. 30, 2016", 7 pgs.
"International Application Serial No. PCT/US2014/068639, International Search Report dated Feb. 26, 2015", 3 pgs.
"International Application Serial No. PCT/US2014/068639, Written Opinion dated Feb. 26, 2015", 5 pgs.
"Korean Application Serial No. 10-2016-7013203, Office Action dated Jan. 19, 2017", W/ English Translation, 9 pgs.
"Korean Application Serial No. 10-2016-7013203, Response filed Mar. 17, 2017 to Office Action dated Jan. 19, 2017", (W/ English Claims), 12 pgs.
"Japanese Application Serial No. 2016-539993, Office Action dated May 30, 2017", W/ English Translation, 6 pgs.
"European Application Serial No. 14872600.3, Extended European Search Report dated Jun. 28, 2017", 8 pgs.
"European Application Serial No. 14872600.3, Response Filed Jan. 5, 2018 to Extended European Search Report dated Jun. 28, 2017", 18 pgs.

* cited by examiner

BASE STATION AND METHOD FOR EARLY HANDOVER USING UPLINK CHANNEL CHARACTERISTICS

TECHNICAL FIELD

Embodiments pertain to wireless communications. Some embodiments relate to handovers in cellular networks, such as E-UTRAN networks operating in accordance with one of the 3GPP standards for the Long Term Evolution (LTE) (3GPP LTE).

BACKGROUND

When a mobile device (e.g., cell phone, UE) with an active/ongoing communication connection (e.g., voice or data call) is moving away from the coverage area of a first cell and entering the coverage area of a second cell, the communication connection is transferred to the second cell (target cell) in order to avoid link termination when the phone gets out of coverage of the first cell (source cell). This "transfer of a connection" is termed handover (or handoff). There may also be other reasons for performing a handover, such as load balancing.

Conventionally, a UE is configured by the mobile network operation (MNO) to perform measurements on downlink signals of various cells usually comprising its own serving cell as well as neighboring cells (of the same RAT, or of a different RAT). The MNO may also configure some reporting details (e.g., trigger events, frequency layer, thresholds, periodicity, etc.) in the UE. The UE in turn is to report its findings to the infrastructure. The final handover decision is taken by the infrastructure side (e.g., by the base station currently serving the UE).

Some new use cases are currently under discussion in 3GPP's RAN working groups (WGs) are dealing with "small cell enhancements" and "dual connectivity". The concept of small cells is about deployment of additional low power nodes under macro layer coverage for capacity extension and coverage improvement purposes. The term "dual connectivity" refers to an operation where the UE consumes radio resources provided by at least two different base stations. In the context of "small cell enhancements" the first base station may be a macro eNB providing a macro cell with basic coverage, while the second base station may be a pico/femto eNB providing a small cell with additional capacity or coverage. One issue with this situation is that due to the low power nature of the additionally deployed small cell nodes, handover decisions performed in the conventional manner may be less than optimum.

Thus there are general needs for base stations and methods for making improved more optimum handover decisions, particular in small-cell deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
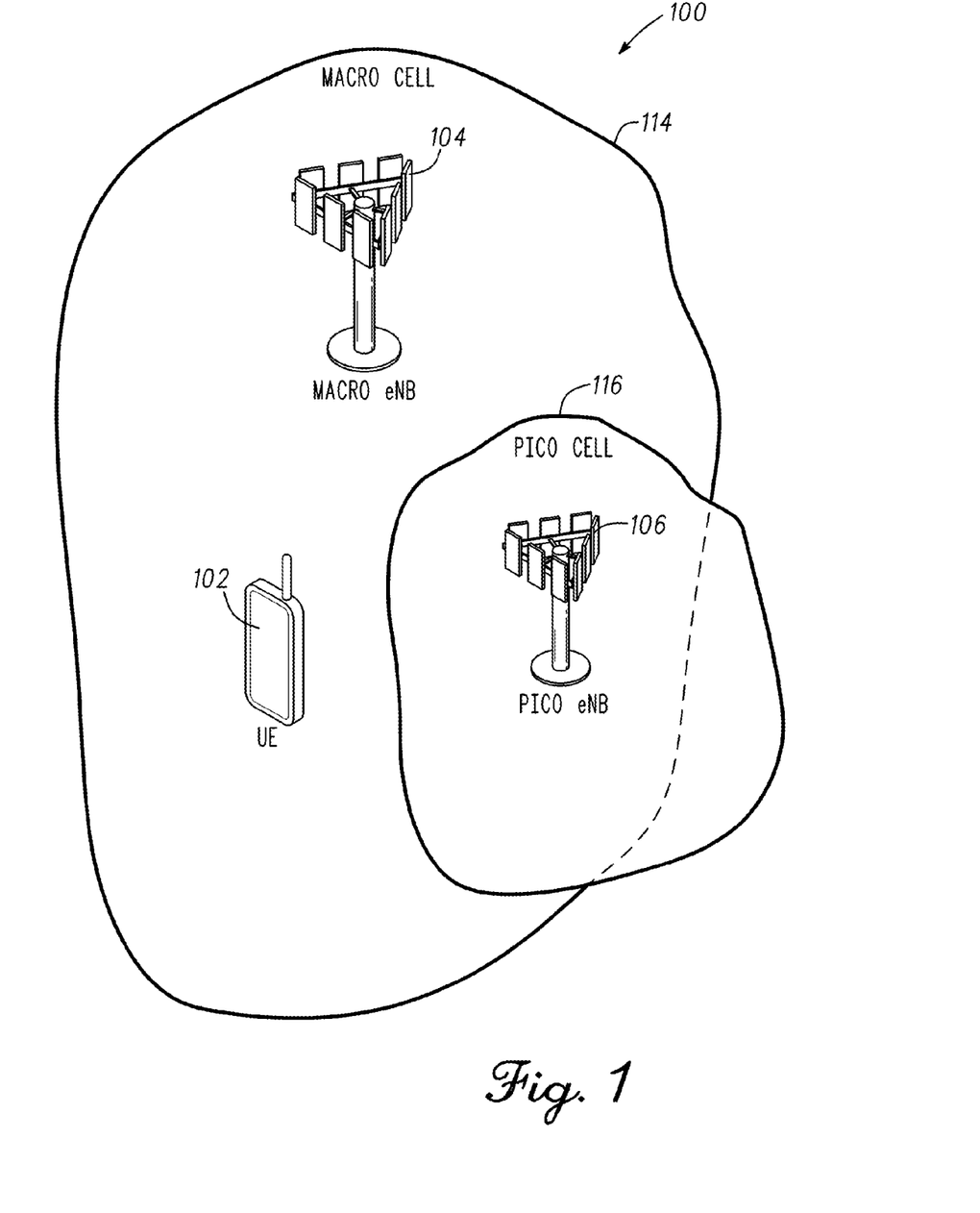
FIG. 1 illustrates a wireless network in accordance with some embodiments.

FIG. 1 illustrates a wireless network in accordance with some embodiments. Wireless network 100 may include a plurality of base stations arranged to provide communication services within cells to mobile devices, such as user equipment (UE) 102. For example, wireless network 100 may include a macro base station 104 to provide communication services within macro cell 114, and pico cell base station 106 to provide communication services within pico cell 116. In accordance with some embodiments, wireless network may be configured to make handover decisions using uplink channel characteristic. These embodiments are described in more detail below.

In some embodiments, the serving base station, such as base station 104, may base a handover decision on a signal level of uplink transmissions of the UE 102 at a target cell base station 106 in addition to signal levels of downlink signals 206 of the target cell base station 106 and downlink signals 204 of a serving cell base station 104 measured by/at the UE. These embodiments are also described in more detail below.

In accordance with embodiments, an enhanced Node B (eNB) operating as a serving cell base station 104 may be arranged to base a handover decision on a signal level of uplink transmissions of the UE 102 measured at a target cell base station 106 in addition to signal levels of downlink signals of the target cell base station 106 and downlink signals of a serving cell base station 104 measured at the UE. In these embodiments, the use of signal levels of uplink transmissions by the UE 102 as part of handover decision may provide for an earlier handover decision to the target cell. This may be particularly beneficial for load balancing between a macro cell and a pico cell, and particularly for offloading traffic from a macro cell to a pico cell. In these embodiments, the UE 102 may measure the downlink signals from both base stations and the target base station 106 may measure the uplink signals from the UE.

In some embodiments, the source cell 114 is a macro cell and the target cell 116 is a pico cell or a femto cell, and the service areas of the source cell 114 and the target cell 116 are at least partially overlapping. In these embodiments, a pico cell or a femto cell may be much smaller than a macro cell and may have a service area that is at least partially within the service area of a macro cell, although this is not a requirement. In these embodiments, a pico cell or a femto cell may be a lower power cell than the macro cell.

In some embodiments, the signal level of the transmissions is used at least in part for a handover decision when the source cell 114 is a macro cell and the target cell 116 is a pico cell or a femto cell. In these embodiments, the eNB 104 may refrain from using the signal level of uplink transmissions when the source cell 114 is a pico cell or a femto cell and the target cell 116 is a macro cell.

In some embodiments, the eNB 104 may determine if a trigger event has occurred, and may configure the target cell base station 106 over an interface to perform signal level measurements on the uplink transmissions from the UE 102 in response to the trigger event. In some embodiments, the trigger event may be a dual connectivity uplink measurements trigger event, although the scope of the embodiments is not limited in this respect.

In some embodiments, the eNB 104 may configure the UE 102 (e.g., by radio-resource control (RRC) signaling) to transmit predefined uplink signals for use by the target cell base station 106 for performing the signal level measurements, the predefined uplink signals being transmitted by the UE in predefined uplink channel resources (i.e., predetermined resource blocks).

In some embodiments, the eNB 104 may instruct the UE to synchronize with the target cell base station, and configure configuring the target cell base station to report the signal level measurements from the predefined uplink signals transmitted by the UE after synchronization of the UE to the target cell base station.

In some embodiments, when the UE 102 is configured for dual connectivity, the UE is configurable to remain synchronized connected with the serving cell base station when synchronized with the target cell base station. In these embodiments, the UE 102 is not configured for dual connectivity, the UE may disconnect from the serving cell base station to temporarily synchronize with the target cell base station for signal level measurements of the uplink signals by the target cell base station.

In some embodiments, the UE 102 may perform a random-access channel (RACH) procedure with the target cell base station to synchronize with the target cell base station.

In some embodiments, the eNB 104 may temporarily release the UE 102 from measurement and reporting obligations with the serving cell base station when the target cell base station is configured to report the signal level measurements from uplink signals transmitted by the UE.

Figure 2A:
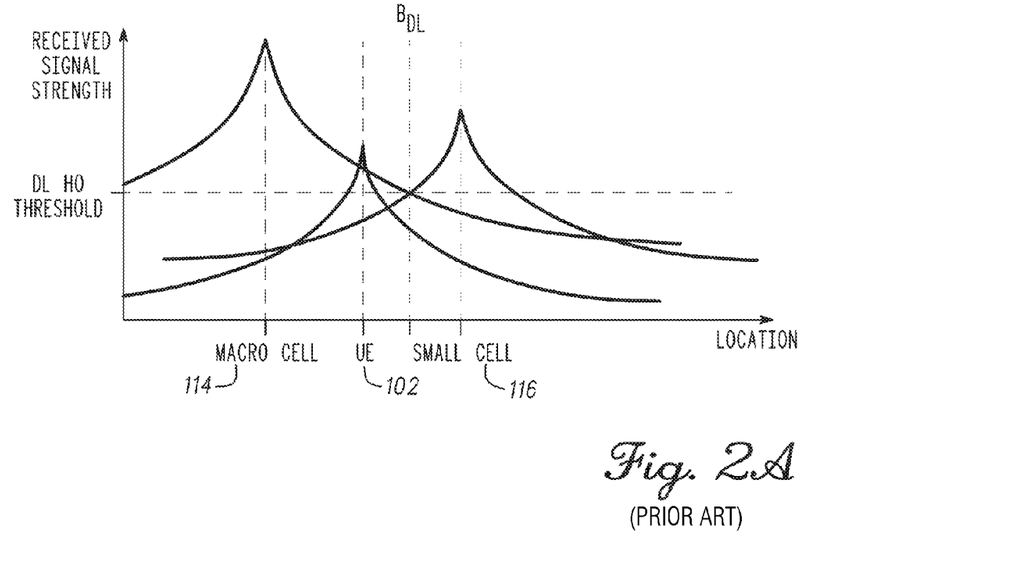
FIG. 2A illustrates conventional handover determination.
Figure 2B:
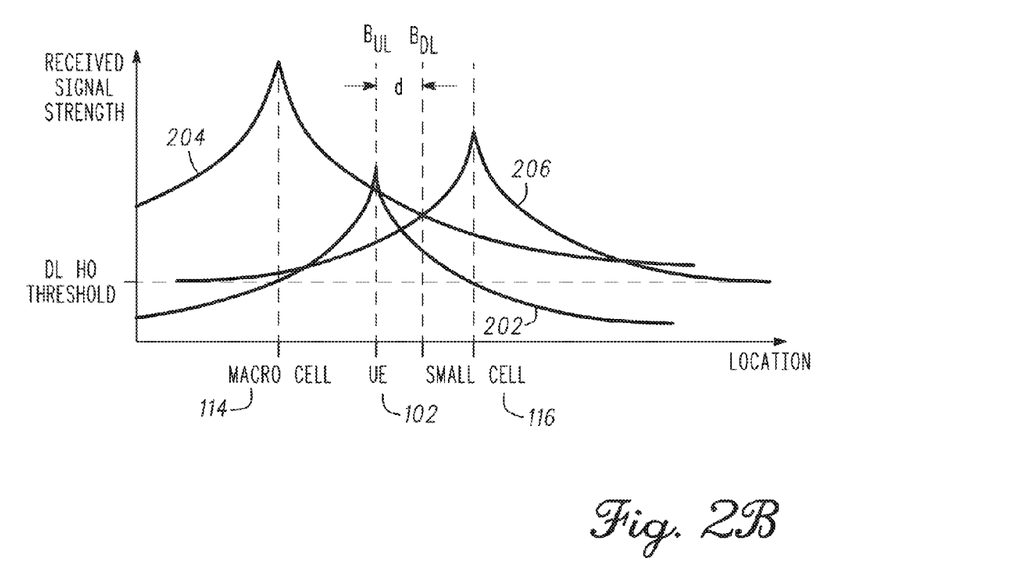
FIG. 2B illustrates handover determination in accordance with some embodiments.

FIG. 2A illustrates conventional handover determination. FIG. 2B illustrates handover determination in accordance with some embodiments. As illustrated in FIGS. 2A and 2B, due to the low power nature of the additionally deployed small cell nodes an uplink/downlink power imbalance occurs. In FIGS. 2A and 2B, the UE 102 may be moving from left (i.e. from macro cell coverage) to right (i.e. into small cell coverage). FIG. 2A depicts the determination of location of $B_{DL}$, (i.e. the location where the downlink signal strength of the low power small cell 116) becomes larger than the downlink signal strength of the macro cell (114).

FIG. 2B depicts signal strength of the UE's uplink transmissions 202 at both macro cell 204 and at small cell 206. The location $B_{UL}$ is the location where the small cell 116 starts to detect a stronger uplink signal than the macro cell 114. The distance d between $B_{DL}$ and $B_{UL}$ shows that for the purpose of "early handover" from a macro cell into a small cell, knowledge about $B_{UL}$ could be used instead of (or in addition to) $B_{DL}$ in the process of making handover decisions.

In accordance with embodiments, methods for utilizing uplink channel characteristics measured in the target cell (e.g., the small cell) are used for making handover decisions. In these embodiments, measurements performed by the target cell on a UE's uplink signals may be utilized instead of (or in addition to) the measurements performed by the UE on downlink signals in the source cell and/or neighboring cells (if configured).

In some embodiments, an exchange of information between the involved base stations may enable this new functionality and new configuration options for the UE in the source cell (e.g., a macro cell). The UE is enabled to assist the target cell (e.g., the small cell) to perform UL measurements while still being located in the source cell (here: macro cell).

In accordance with some embodiments, the uplink/downlink power imbalance that occurs in low power small cell deployment scenarios is exploited for early handover decisions. A first base station (e.g., macro cell) may configure a second base station (e.g., small cell) to perform measurements on a particular UE's uplink signals. The first base station (e.g., a macro cell) may also configure the UE in question to use certain predefined (e.g., cell specific, UE specific, or scenario specific) uplink radio resources (or, predefined signals) for easy detection by the second base station (e.g., a small cell). Early handover from a macro cell into a small cell for the purpose of load balancing can be achieved.

In these embodiments, the first base station 104 is providing cell 1, which is a macro cell (i.e., cell 114). The second base station 106 is providing cell 2, which is a low power small cell (i.e., cell 116). In some embodiments, the base stations may be enhanced Node B's (eNBs). Other terminologies can also be used, e.g. first base station/cell1, master eNB/cell, primary eNB/cell, anchor eNB/cell, MeNB. Similarly, small eNB/cell may also refer to second base station/cell2, slave eNB/cell, secondary eNB/cell, assisting eNB/cell, or SeNB.

In some embodiments, temporary synchronization of the UE 102 to cell2 without leaving cell1 (i.e. without losing the connection to cell1) is provided. In these embodiments, the normal operation in cell2 is not disturbed as there may be many other UEs that may be using cell2 as their serving cell.

In some embodiments, the coverage areas of cell and cell2 overlap at least partially. The first base station may trigger configuration of UL measurements in cell2 based on the following information:

Group A: Trigger events detected by the UE: RRM measurements collected by UE, RF fingerprints detected by UE, or Location fixes, for instance performed by means of GNSS technology.

Group B: Trigger events detected by the first base station: RRM measurements reported by the UE, RF fingerprints reported by the UE, or Network based positioning operations with or without UE assistance.

Ideally, timing advance settings do not have to be adjusted as the physical distance to both base stations involved in the procedure can be expected to be roughly the same when the UE is near location $B_{UL}$ as FIG. 2 shows. However, in some embodiments, the second base station may be configured with a detection window large enough to detect the UE's (repeating pattern of) UL signal(s) in cell2.

Figure 3:
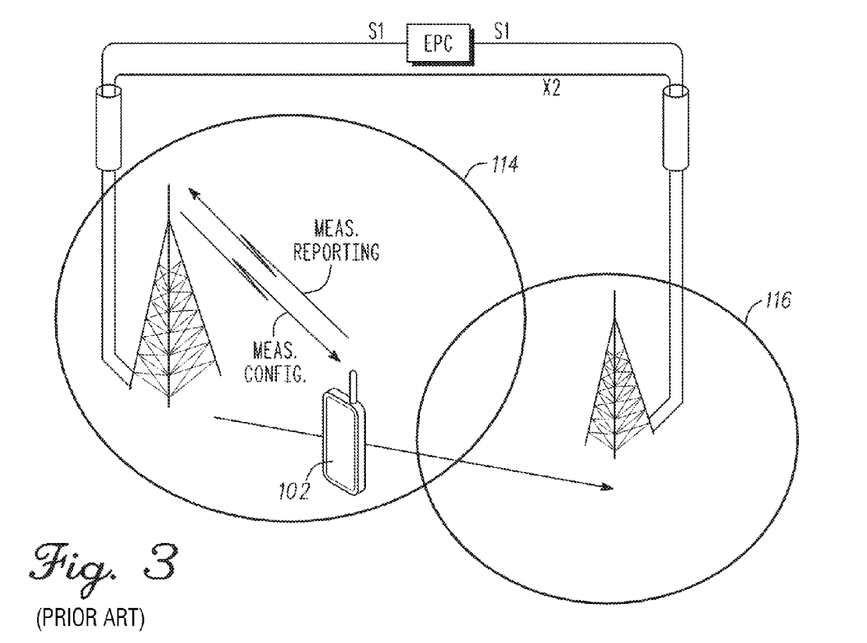
FIG. 3 illustrates wireless network operation for conventional handover determination.
Figure 4:
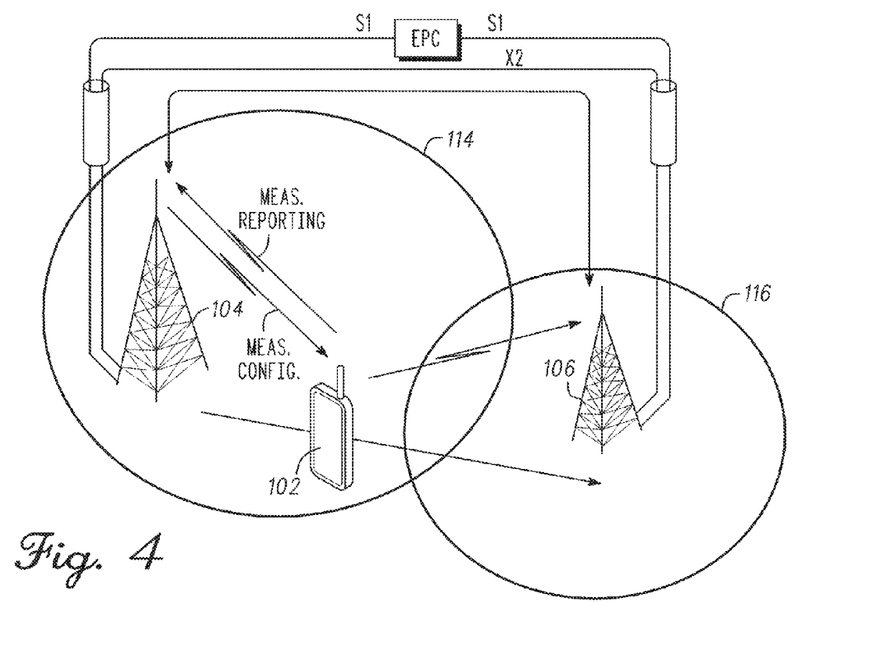
FIG. 4 illustrates wireless network operation for handover determination in accordance with some embodiments.

FIG. 3 illustrates wireless network operation for conventional handover determination. FIG. 3 shows the conventional operation of a UE in an RRC_CONNECTED state. The UE 102 is residing in coverage of cell 114 (i.e. the UE 102 may be performing RRM measurements as configured by its serving base station (i.e. by the first base station)). FIG. 4 illustrates wireless network operation for handover determination in accordance with some embodiments. In these embodiments, when dual connectivity UL measurements trigger event occurs (for instance detected by the first base station, possibly based on reports received from the UE), the first base station may choose to kick off one or more of the following procedural steps.

Part 1: The macro base station may configure the small cell base station to perform measurements on a particular UE's uplink signals. In these embodiments, the X2 signaling between a first base station (eNB1) and a second base station (eNB2) may be enhanced as described below and as illustrated in FIG. 4 "Cell2 Meas Config" 422. In these embodiments, eNB1 may inform eNB2 about temporary UL measurement opportunities in cell2 and that the UL measurement opportunities for a given UE in cell2 are limited in time. The eNB1 may configure eNB2 what category of uplink signal(s) to monitor (e.g., cell specific, UE specific, scenario specific or cluster specific).

In the case of cluster-specific uplink signals to monitor, one cluster may consist of one or several small cells located in proximity to one another. In one embodiment, the macro eNB may inform a cluster of small cell eNBs to monitor a particular uplink radio resource (such as common SRS configurations across multiple cells within a cluster).

The eNB1 may tell eNB2 for how long the UE will "appear" in cell2, for instance in order to disseminate UL reference signals, or make RACH attempts. The eNB1 may instruct eNB2 to detect uplink reference signals from a particular UE. The UL reference signals may include at least Sounding Reference Signals (SRS) and Demodulation Reference Signals (DRS). The eNB1 may inform eNB2 about the identity of the UE in question. The eNB1 may also inform eNB2 about an identifier of the measurement configuration in Cell2.

When the eNB1 receives a measurement report from the UE 102 informing that the UE has been detected cell2 (this should be a new event trigger which would force the UE to report much earlier (e.g., as soon as the UE detects the cell), then eNB1 can configure eNB2 to perform the measurements of interest.

In some embodiments, the UE may attempt to perform RACH access in cell2 (this may be helpful when the UE is not yet in sync with cell2). It may be beneficial to use a special (e.g., reserved) random access preamble for this in cell2 in order to inform eNB2 about the special character of this random access process. This special random access preamble may have been received from eNB1 before. If such a special random access preamble is detected by eNB2, eNB2 knows that the random access procedure doesn't have to be completed. Only measurements of the UE's UL signal strength in cell2 need to be collected. In some other embodiments, the UE may be configured, once it is in sync with cell2, to send some pieces of user data and to let eNB2 evaluate demodulation reference signals, or to configure it to send nothing at all (apart from some sounding reference signals (SRS)) and to let eNB2 evaluate these for a limited amount of time.

In some embodiments, the reporting from eNB2 to eNB1 ("Cell2 Meas Reporting") in FIG. 4 may comprise (a combination of) the following pieces of information: UL reception quality of the UE measured by eNB2. I, UE's identity, Identifier of the measurement configuration as described above, Time stamp, Physical resource ID (e.g. SRS). In some embodiments, the UL reception quality refers to UL Reference Signal Receiving Power (UL RSRP), although the scope of the embodiments is not limited in this respect.

In some embodiments, eNB1 may temporarily release the UE 102 from its measurement and reporting obligations in cell1. In these embodiments, eNB1 may define temporary "connection gaps" in cell for the purpose of performing UL measurement in neighboring cell2. Existing measurement gaps may be re-used for this in cell (e.g., if the time interval during which the UE is temporarily released from its measurement and reporting obligations in cell fits into existing gaps). In some embodiments, new measurement gaps tailored to this particular purpose could be defined. Generally, for activation of this special type of gaps in cell several options exist, depending on the configuration of the UE's UL signal(s). For example, the UE 102 may be configured to perform just one short UL transmission, or a periodic pattern of UL signals. Also, new gap(s) could be defined (e.g., with a duration of less than 6 ms however if the UE is configured to transmit SRS, a full 6 ms cycle may not be needed). In some embodiments, an autonomous gap (but for UL purpose) may be reused.

Part 2: Special uplink signals are configured in the UE to enable uplink measurements in a potential target cell. In these embodiments, the signaling between eNB1 and the UE 102 may be enhanced and is illustrated as "UE Meas Config" in FIG. 4. In these embodiments, eNB1 may send a "sync to eNB2" command to the UE. This may be part of a RRM measurement configuration, or may be event triggered (i.e. when a "dual connectivity UL measurements trigger event" is detected). This command may be sent as soon as the UE reports that eNB2 is detected. This command may comprise the (category of) uplink signal(s) to be used by the UE. The categories may include cell specific, UE specific, scenario specific or cluster-specific as described above. In these embodiments, the sync to eNB2 command may include a duration describing how long the UE will "appear" in cell2, for instance in order to disseminate UL reference signals, or make RACH attempts. This command may also include the type of UL activity, UL reference signals, such as demodulation reference signals sounding reference signals, or RACH attempts. The command may also include an assignment of predefined UL resources to be used in cell2

If the UE 102 has dual transceiver capabilities, a parallel connection to both eNBs may be maintained, however if the UE is equipped with a single transceiver, then a temporary connection to eNB2 may be enabled allowing the UE to come back to eNB1.

In FIG. 3, the moving UE may be in-sync with its serving cell, measuring downlink signals and reporting to its serving cell. In FIG. 4, the 'possible' target cell 116 is in-sync with a 'foreign' UE (a UE that is being service by another cell), is performing measurements on this UE's uplink signals, and is reporting to the serving cell via the X2 interface.

Figure 5:
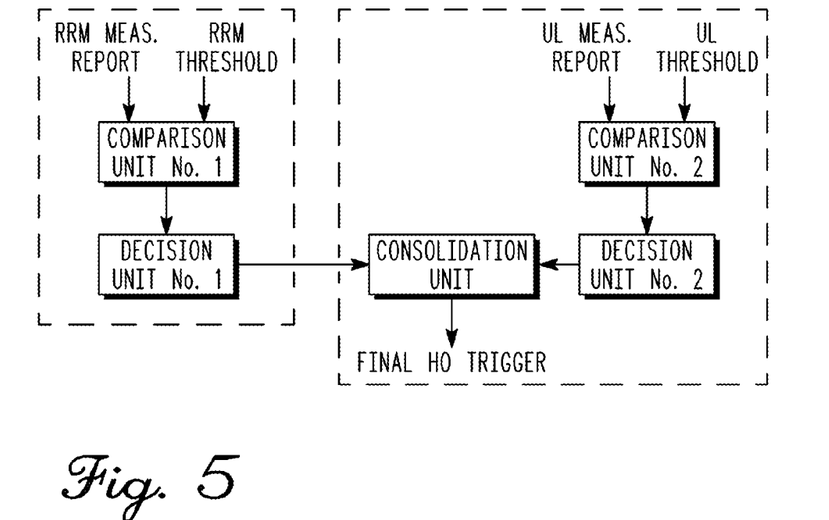
FIGS. 5-8 illustrate the generation of a consolidated handover trigger command in accordance with various embodiments.

FIGS. 5-8 illustrate the generation of a consolidated handover trigger command in accordance with various embodiments. For the final handover decision, eNB1 may take eNB2's measurements into account as depicted in FIG. 5. In detail, eNB1 may base its decision on eNB2's UL measurements (those that were collected by eNB2 while the UE was temporarily visiting neighboring cell2) instead of, or in addition to the UE's normal RRM measurements collected in cell1.

In some embodiments, a distributed approach, where parts of the functional entities may reside in eNB2 and other parts in eNB1, may be performed. In other embodiments, the consolidation unit may be located in the eNB1.

Figure 6:
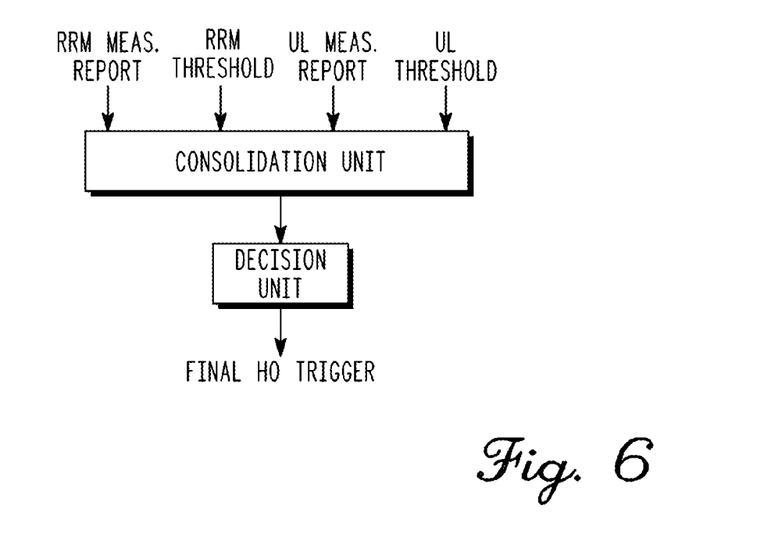

In another embodiment, the two "Comparison Unit" functional entities and/or the two "Decision Unit" functional entities of FIG. 5 may be combined as depicted in FIG. 6 which shows a more-centralized approach. When the two "Decision Unit" functional entities of FIG. 5 are combined, no "Consolidation Unit" is needed. While it is possible to locate either the combined "Comparison" functional entity or the combined "Decision" functional entity in eNB2, it is deemed beneficial to locate both of the combined functional entities (i.e. for "Comparison" and "Decision") in eNB1 in order to restrict message exchange over the X2 interface. In FIGS. 5 and 6, the radio-resource measurement (RRM) report may be collected by the UE in cell one and the UL measurement report may be collected by eNB 2. In FIG. 5, decision unit number 1 may provide a first HO trigger, and decision unit number 2 may provide a second HO trigger.

Figure 7:
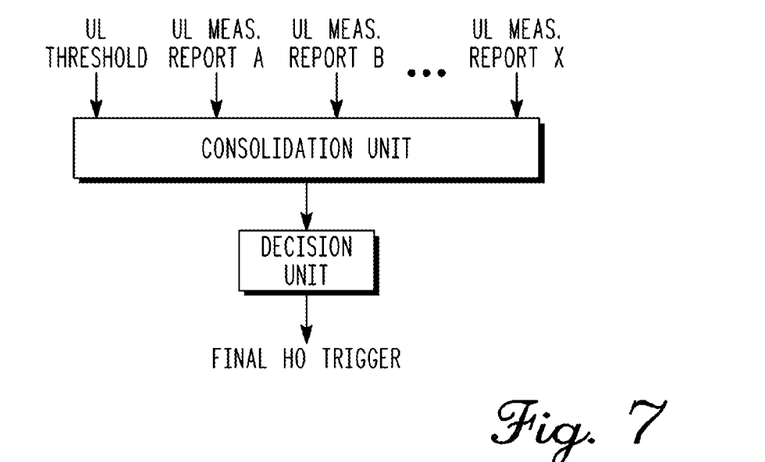
Figure 8:
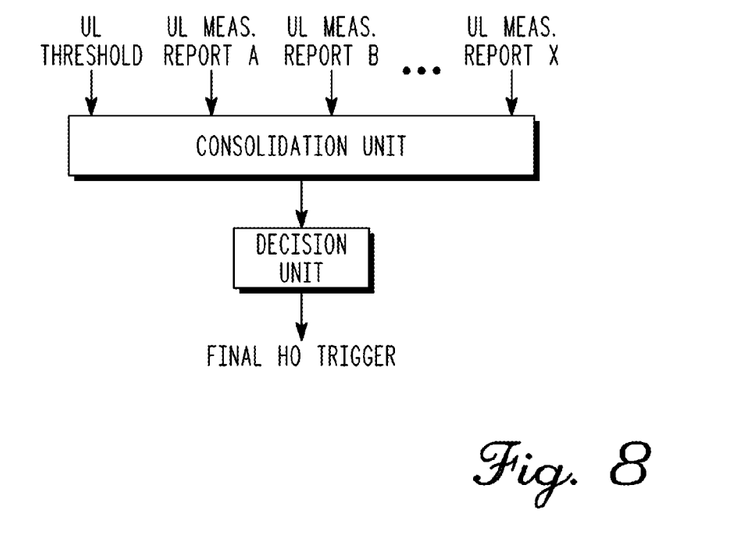

In yet another embodiment, UL measurements taken by different eNBs may be compared against each other for handover decisions. RRM measurements collected by the UE in cell may be neglected. These embodiments are illustrated in FIG. 7. For example, UL measurement report A may be collected by eNB A, UL measurement report B may be collected by eNB B, etc.

In another embodiment (illustrated in FIG. 8), UL measurements may be taken over time from a single eNBs are compared with each other for the purpose of making handover decisions. In some embodiments (not separately illustrated), the process of making an appropriate handover assessment may include combining UL measurements taken by different eNBs (according to FIG. 7) with UL measurements taken over time (according to FIG. 8). For example, UL measurement report A may be collected by eNB A at a first time, UL measurement report B may be collected by eNB A at a second time, etc.

In some embodiments, the eNodeBs are interconnected with each other by means of the X2 interface. Furthermore eNodeBs are connected by means of the Si interface to the EPC (Evolved Packet Core). The Si interface as defined by 3GPP supports a many-to-many relation between EPC and eNodeB, i.e. theoretically different operators may simultaneously operate the same eNodeB (this is also known as "network sharing"). When a UE is switched on it first needs to synchronize to each of the detected frequencies and check whether it is allowed to access any of these (i.e. it is supposed to check whether a given frequency is a frequency from the right MNO to which it wants to connect to). For this the UE is required to go through an initial synchronization process. Once it is synchronized to a given frequency, the UE reads the mobile communication network's System Information broadcast starting with the MIB (master information block) to check whether this is the right PMLN. If the disseminated PMLN-ID is correct (and some other criteria are met), the UE proceeds with reading SIB1 and SIB2.

The next step is known as the Random Access Procedure in which the network for the first time knows that some UE is trying to get access. At this stage, UE does not yet have any resources or channels assigned to inform the infrastructure side about its intention to connect to the network; the UE's first request is therefore transmitted on shared resources.

When there are many other UEs in the same cell also sending requests in UL direction, so there is a risk of collision among the requests. Such random access procedure is called contention based Random Access Procedure. The network can inform UEs to use some unique identity to prevent its requests from colliding with requests stemming from other UEs. The second scenario is called non-contention based Random Access Procedure. When the UE sends the very first message of the Random Access Procedure to the network, it may send a specific pattern or signature which is called "RACH preamble". The preamble value helps differentiate requests coming in from different UEs. If two UEs use (by chance) same RACH preamble at same time then there might be collision.

In LTE the eNB often allocates only a part of the fully available system bandwidth for a specific UE and at a specific time. So it would be good to know which section across the overall bandwidth has better channel quality comparing to the other region. In this case, the network could allocate the specific frequency region which is the best for each of the UEs. Sounding Reference Signals (SRS) are interspersed over the fully available system bandwidth enabling the eNodeB to figure out the channel quality of an uplink path for each subsections of the frequency region. SRS are sent by the UE in UL direction at the last symbol of a slot. There are two kinds of SRS: Cell specific SRS and UE specific SRS. The repetition pattern of sending SRS depends on the configuration set by the network infrastructure, but UE can transmit it every two subframes at the most and every 32 frame (320 subframes) at the least. To avoid collision with SRS send by other UEs, each UE can be configured to transmit SRS in hopping mode with a different hopping schedule. SRS configuration can be notified to the UE by a couple of RRC messages, such as for example SIB-2, RRC Connection Setup message, RRC Connection Reconfiguration message.

In some embodiments, the UE 102 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 102 may include one or more of a keyboard, a display, a non-volatile memory port, multiple antennas, a graphics processor, an application processor, speakers, and other mobile device elements. The display may be an LCD screen including a touch screen. In some embodiments, the UE 102 and the eNB may utilize one or more antennas. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result.

Although FIGS. 5-8 illustrate several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An enhanced node B (eNB) arranged to operate as a serving cell base station, the eNB comprising:
   memory and processing circuitry, wherein:
      the processing circuitry is to provide service to user equipment (UE) in a first service area, including sending downlink signaling to the UE and receiving uplink signaling from the UE;
      the processing circuitry is to send a command for transmission to the UE to configure the UE to transmit predefined uplink signaling for reception by a target cell base station in a second service area for performing signal level measurements while the UE is located in the first service area, the command specifying the predefined uplink signaling to be transmitted by the UE in predefined uplink channel resources that include a specified category of uplink signaling;
      the processing circuitry is to send a command for transmission to the UE to configure the UE to synchronize with the target cell base station;
      the processing circuitry is to send a command for transmission to the target cell base station, via an inter-base-station communication channel, to configure the target cell base station to report the signal level measurements from the predefined uplink signaling transmitted by the UE after synchronization of the UE to the target cell base station;
      the processing circuitry is to receive an indication, transmitted by the target cell base station via the inter-base-station communication channel, of a signal level of uplink transmissions of the UE measured at the target base station;
      the processing circuitry is to receive an indications of signal levels of downlink signals of the target cell base station and downlink signals of the serving cell base station, as measured at the UE; and
      the processing circuitry is to generate a handover decision based on the signal level of uplink transmissions of the user equipment (UE) as measured at the target cell base station in addition to the signal levels of downlink signals of the target cell base station and downlink signals of the serving cell base station as measured at the UE.

2. The eNB of claim 1 wherein the serving cell is a macro cell and the target cell is a pico cell or a femto cell, and wherein service areas of the serving cell and the target cell are at least partially overlapping.

3. The eNB of claim 1 wherein the signal level of the uplink transmissions is used at least in part for a handover decision when the serving cell is a macro cell and the target cell is a pico cell or a femto cell, and wherein the processing circuitry is to refrain from using the signal level of uplink transmissions when the serving cell is a pico cell or a femto cell and the target cell is a macro cell.

4. The eNB of claim 1, wherein the processing circuitry is to:
   determine if a trigger event has occurred; and
   configure the target cell base station over an interface to perform signal level measurements on the uplink transmissions from the UE in response to the trigger event.

5. The eNB of claim 4 wherein the trigger event is a dual connectivity uplink measurements trigger event.

6. The eNB of claim 1, wherein the processing circuitry is to send the command for transmission to the UE to configure the UE to transmit the predefined uplink signaling for reception by the target cell base station via radio-resource control (RRC) signaling.

7. The eNB of claim 1, wherein the processing circuitry is to send the command for transmission to the UE to configure the UE to synchronize with the target cell base station via radio-resource control (RRC) signaling.

8. The eNB of claim 1, wherein the processing circuitry is to send a command for transmission to the UE to configure the UE to temporarily suspend measurement and reporting operations with the eNB when the target cell base station is configured to report the signal level measurements from the predefined uplink signaling transmitted by the UE.

9. The eNB of claim 1, wherein when the UE is configured for dual connectivity, the UE is configurable to remain synchronized connected with the serving cell base station when synchronized with the target cell base station.

10. The eNB of claim 1, wherein the specified category of uplink signaling includes at least one category selected from the group consisting of: cell-specific uplink signaling, UE-specific uplink signaling, scenario-specific uplink signaling, or cluster-specific uplink signaling.

11. At least one non-transitory machine-readable medium containing instructions that, when executed by an enhanced node B (eNB) arranged to operate as a serving cell base station, cause the eNB to:
   provide service to user equipment (UE) in a first service area, including sending downlink signaling to the UE and receiving uplink signaling from the UE;
   send a command to the UE to configure the UE to transmit predefined uplink signaling for reception by a target cell base station in a second service area for performing signal level measurements while the UE is located in the first service area, the command specifying the predefined uplink signaling to be transmitted by the UE in predefined uplink channel resources that include a specified category of uplink signaling;
   send a command to the UE to configure the UE to synchronize with the target cell base station;
   send a command to the target cell base station, via an inter-base-station communication channel, to configure the target cell base station to report the signal level measurements from the predefined uplink signaling transmitted by the UE after synchronization of the UE to the target cell base station;
   receive an indication, transmitted by the target cell base station via the inter-base-station communication channel, of a signal level of uplink transmissions of the UE measured at the target base station;
   receive an indications of signal levels of downlink signals of the target cell base station and downlink signals of the serving cell base station, as measured at the UE; and generate a handover decision based on the signal level of uplink transmissions of the user equipment (UE) as measured at the target cell base station in addition to the signal levels of downlink signals of the target cell base station and downlink signals of the serving cell base station as measured at the UE.

12. The at least one machine-readable medium of claim 11 wherein the serving cell is a macro cell and the target cell is a pico cell or a femto cell, and wherein service areas of the serving cell and the target cell are at least partially overlapping.

13. The at least one machine-readable medium of claim 11 wherein the signal level of the uplink transmissions is used at least in part for a handover decision when the serving cell is a macro cell and the target cell is a pico cell or a femto cell, and wherein the instructions are to further cause the eNB to refrain from using the signal level of uplink transmissions when the serving cell is a pico cell or a femto cell and the target cell is a macro cell.

14. The at least one machine-readable medium of claim 11, wherein the instructions are to further cause the eNB to:
determine if a trigger event has occurred; and
configure the target cell base station over an interface to perform signal level measurements on the uplink transmissions from the UE in response to the trigger event.

15. The at least one machine-readable medium of claim 14 wherein the trigger event is a dual connectivity uplink measurements trigger event.

16. The at least one machine-readable medium of claim 11, wherein the instructions are to further cause the eNB to send the command for transmission to the UE to configure the UE to transmit the predefined uplink signaling for reception by the target cell base station via radio-resource control (RRC) signaling.

17. The at least one machine-readable medium of claim 11, wherein the instructions are to further cause the eNB to send the command for transmission to the UE to configure the UE to synchronize with the target cell base station via radio-resource control (RRC) signaling.

18. The at least one machine-readable medium of claim 11, wherein the instructions are to further cause the eNB to send a command for transmission to the UE to configure the UE to temporarily suspend measurement and reporting operations with the eNB when the target cell base station is configured to report the signal level measurements from the predefined uplink signaling transmitted by the UE.

19. The at least one machine-readable medium of claim 11, wherein when the UE is configured for dual connectivity, the UE is configurable to remain synchronized connected with the serving cell base station when synchronized with the target cell base station.

20. The at least one machine-readable medium of claim 11, wherein the specified category of uplink signaling includes at least one category selected from the group consisting of: cell-specific uplink signaling, UE-specific uplink signaling, scenario-specific uplink signaling, or cluster-specific uplink signaling.

* * * * *